(12) United States Patent
Fasani

(10) Patent No.: US 12,003,904 B2
(45) Date of Patent: Jun. 4, 2024

(54) INSTRUMENT MONITORING SYSTEM

(71) Applicant: AGILENT TECHNOLOGIES, INC., Santa Clara, CA (US)

(72) Inventor: Rick Fasani, San Jose, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 0 days.

(21) Appl. No.: 18/012,616

(22) PCT Filed: Jun. 30, 2021

(86) PCT No.: PCT/US2021/039948
§ 371 (c)(1),
(2) Date: Dec. 22, 2022

(87) PCT Pub. No.: WO2022/006307
PCT Pub. Date: Jan. 6, 2022

(65) Prior Publication Data
US 2023/0262366 A1    Aug. 17, 2023

Related U.S. Application Data
(60) Provisional application No. 63/046,964, filed on Jul. 1, 2020.

(51) Int. Cl.
*H04Q 9/00* (2006.01)
*G01N 35/00* (2006.01)
(52) U.S. Cl.
CPC ......... *H04Q 9/00* (2013.01); *G01N 35/00871* (2013.01); *G01N 2035/00881* (2013.01); *G01N 2035/009* (2013.01); *H04Q 2209/823* (2013.01)
(58) Field of Classification Search
CPC ............... H04Q 9/00; H04Q 2209/823; G01N 35/00871; G01N 2035/00881;
(Continued)

(56) References Cited

U.S. PATENT DOCUMENTS

2002/0173702 A1* 11/2002 Lebel ................ A61M 5/14276
600/300
2003/0028079 A1* 2/2003 Lebel .................... A61M 5/168
600/300
(Continued)

FOREIGN PATENT DOCUMENTS

KR        20100009348 A      1/2010

OTHER PUBLICATIONS

International Search Report and Written Opinion for PCT/US2021/039948 dated Oct. 22, 2021.
(Continued)

*Primary Examiner* — Amine Benlagsir
(74) *Attorney, Agent, or Firm* — Chang & Hale LLP

(57) ABSTRACT

Systems and methods are disclosed for capturing and interpreting data streams between an instrument and a controlling device. A processor is configured to receive a data stream sent by the instrument to the controlling device and identify data frames in the stream. The processor is configured to search for a bit pattern in the stream, identify bits corresponding to a message length of a first presumed data frame based on a location relative to the bit pattern, and identify a second presumed data frame in the data stream based on the message length of the first presumed data frame. The processor is further configured to identify a second instance of the bit pattern, increase a count, continue scanning, extract and store instrument measurement data or operational metadata from the identified data frames, and analyze or interpret the captured data and metadata for visualization or alerts.

20 Claims, 8 Drawing Sheets

(58) Field of Classification Search
CPC . G01N 2035/009; H04L 43/026; H04L 43/04; H04L 43/18
See application file for complete search history.

(56) References Cited

U.S. PATENT DOCUMENTS

| | | | | |
|---|---|---|---|---|
| 2003/0028080 | A1* | 2/2003 | Lebel | G16H 20/17 600/300 |
| 2003/0050535 | A1* | 3/2003 | Bowman, IV | A61B 5/6847 600/300 |
| 2004/0042471 | A1* | 3/2004 | Yung | G05B 15/02 370/401 |
| 2004/0210267 | A1* | 10/2004 | Lebel | G06F 8/60 607/32 |
| 2004/0225338 | A1* | 11/2004 | Lebel | G06F 3/065 607/60 |
| 2005/0149569 | A1* | 7/2005 | Hariharan | G16H 10/40 |
| 2005/0195930 | A1* | 9/2005 | Spital | G06F 8/60 375/368 |
| 2012/0033556 | A1* | 2/2012 | Kruglick | H04L 43/026 370/241 |
| 2016/0191392 | A1* | 6/2016 | Liu | H04L 47/125 370/235 |
| 2017/0279723 | A1* | 9/2017 | Vedam | H04L 43/12 |
| 2019/0252072 | A1* | 8/2019 | Parker | G06Q 10/103 |

OTHER PUBLICATIONS

J.L. Muros-Cobos et al., "Monitoring experiments using mobile devices"., DOI: 10.1109/CIVEMSA.2013.6617410, ResearchGate, Mar. 21, 2015, pp. 1-6 and figures 1,3.

* cited by examiner

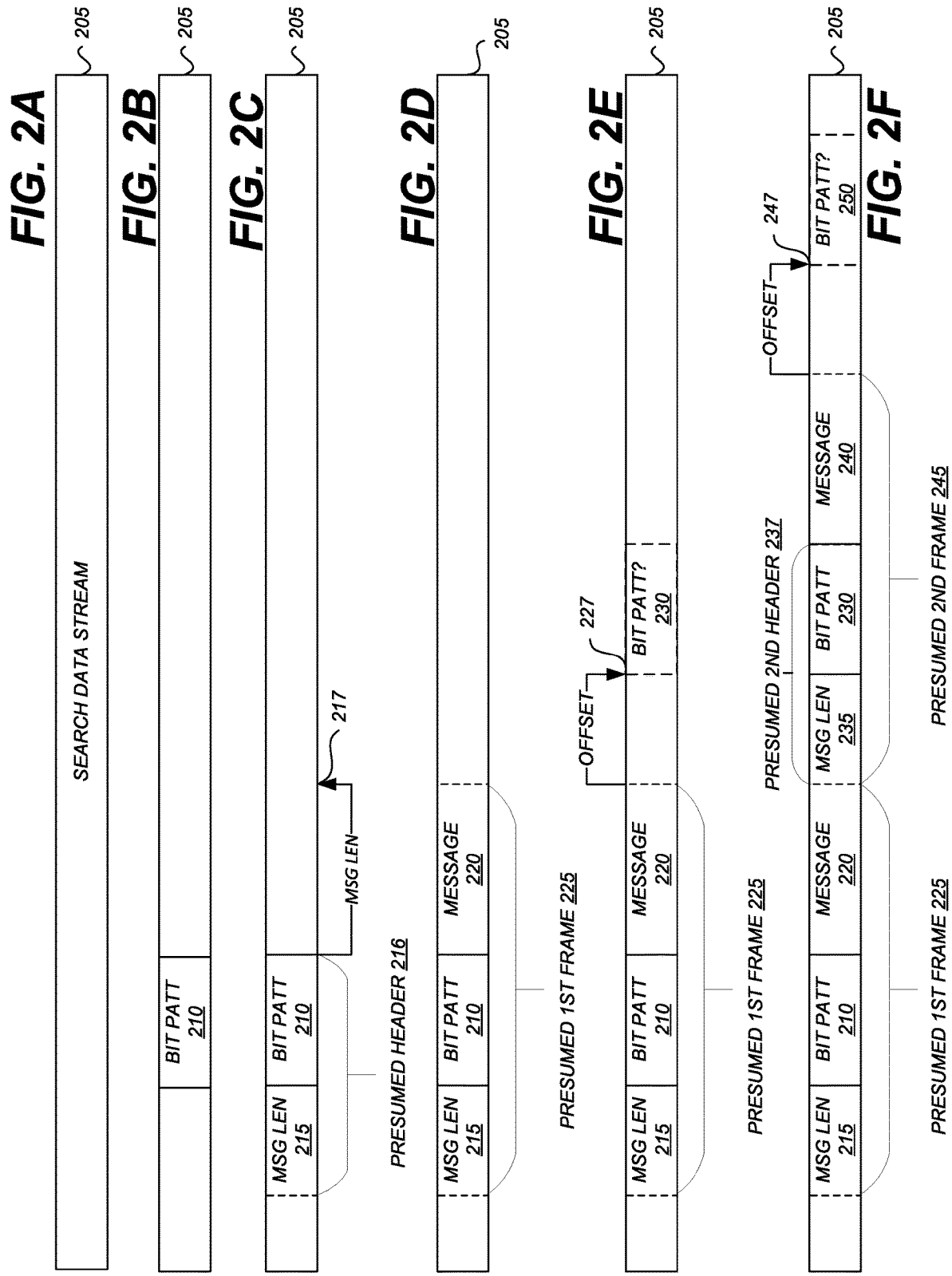

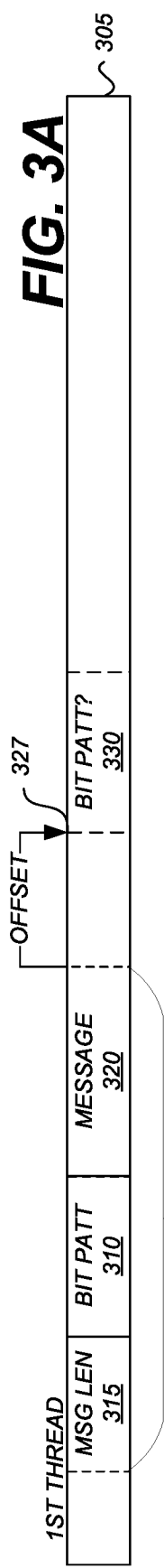
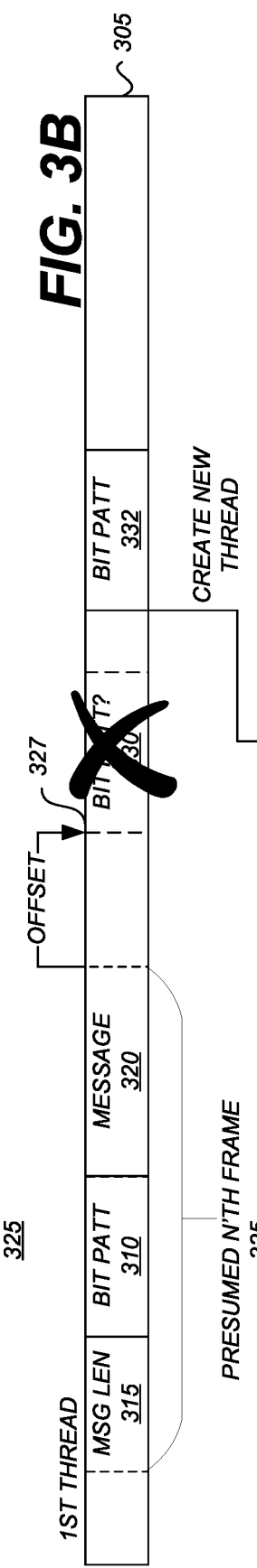
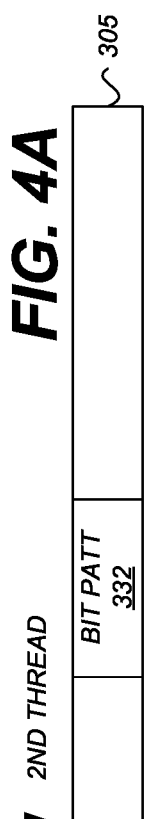
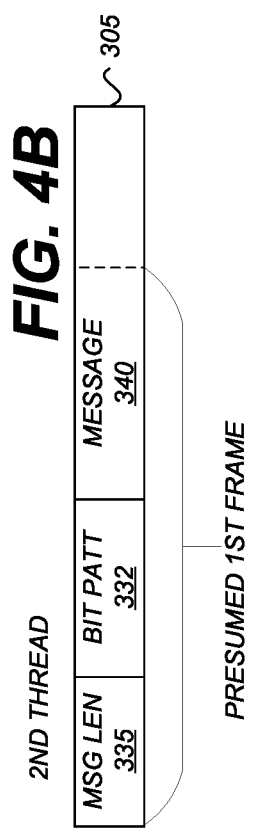

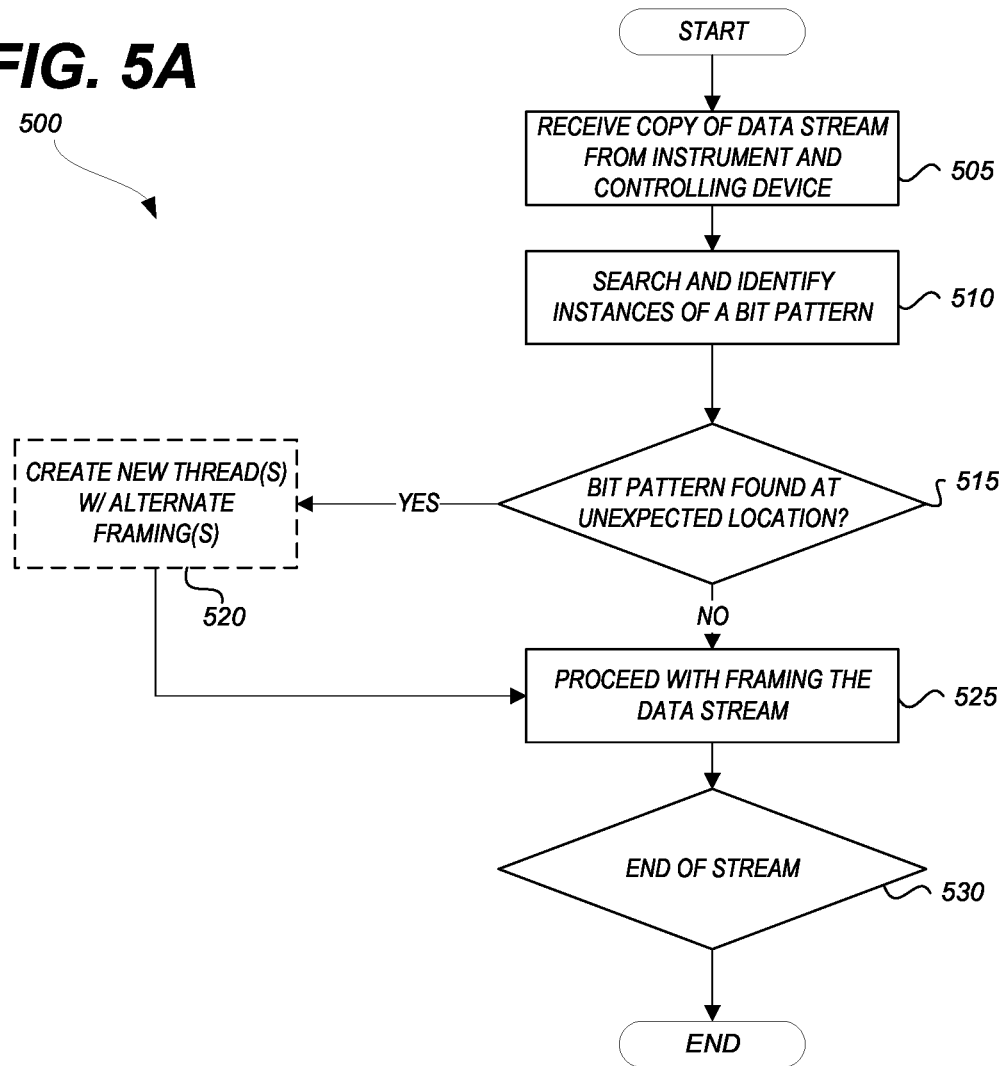

INSTRUMENT MONITORING SYSTEM

CROSS-REFERENCE TO RELATED APPLICATION

This application is a national stage application, filed under 35 U.S.C. § 371, of International Patent Application No. PCT/US2021/039948, entitled Instrument Monitoring System, filed on Jun. 30, 2021, which claims priority to U.S. Provisional Application 63/046,964, entitled Instrument Monitoring System, filed Jul. 1, 2020, the disclosures of which are incorporated herein by reference in their entireties.

BACKGROUND

Field

The present disclosure relates to monitoring systems. In particular, the present disclosure relates to instrument monitoring systems, such as those used in a laboratory.

Description of Related Art

Instruments and software solutions enable laboratories to quantify and analyze the physical and biological properties of substances and products, as well as interrogate samples at the molecular and cellular level. Such instruments can include liquid chromatographs, gas chromatographs, liquid chromatography mass spectrometers, gas chromatography mass spectrometers, inductively coupled plasma mass spectrometers, atomic absorption spectrometers, microwave plasma atomic emission spectrometers, inductively coupled plasma optical emission spectrometers, Raman spectrometers, cell analysis plate-based assay systems, flow cytometers, and real-time cell analyzers. These instruments can be used in a variety of settings, such as in pharmaceutical, biotechnology, academic, government, chemical, environmental, forensics, and food production facilities. In addition to the experimental measurement data, operational data from these instruments, sometimes referred to as metadata, can be collected for analysis.

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure.

FIGS. 2A-2F illustrate a sample search of a data stream undergoing a framing process, in accordance with one or more embodiments.

FIGS. 3A-3B illustrate a sample search that fails to find the distinctive bit pattern in the expected location in the data stream, in accordance with one or more embodiments.

FIGS. 4A-4B illustrate a sample search using an alternate framing hypothesis by a second thread, in accordance with one or more embodiments.

FIG. 5A illustrates a flow diagram illustrating an example process for framing the data stream, in accordance with one or more embodiments.

SUMMARY OF THE INVENTION

Figure 1A:
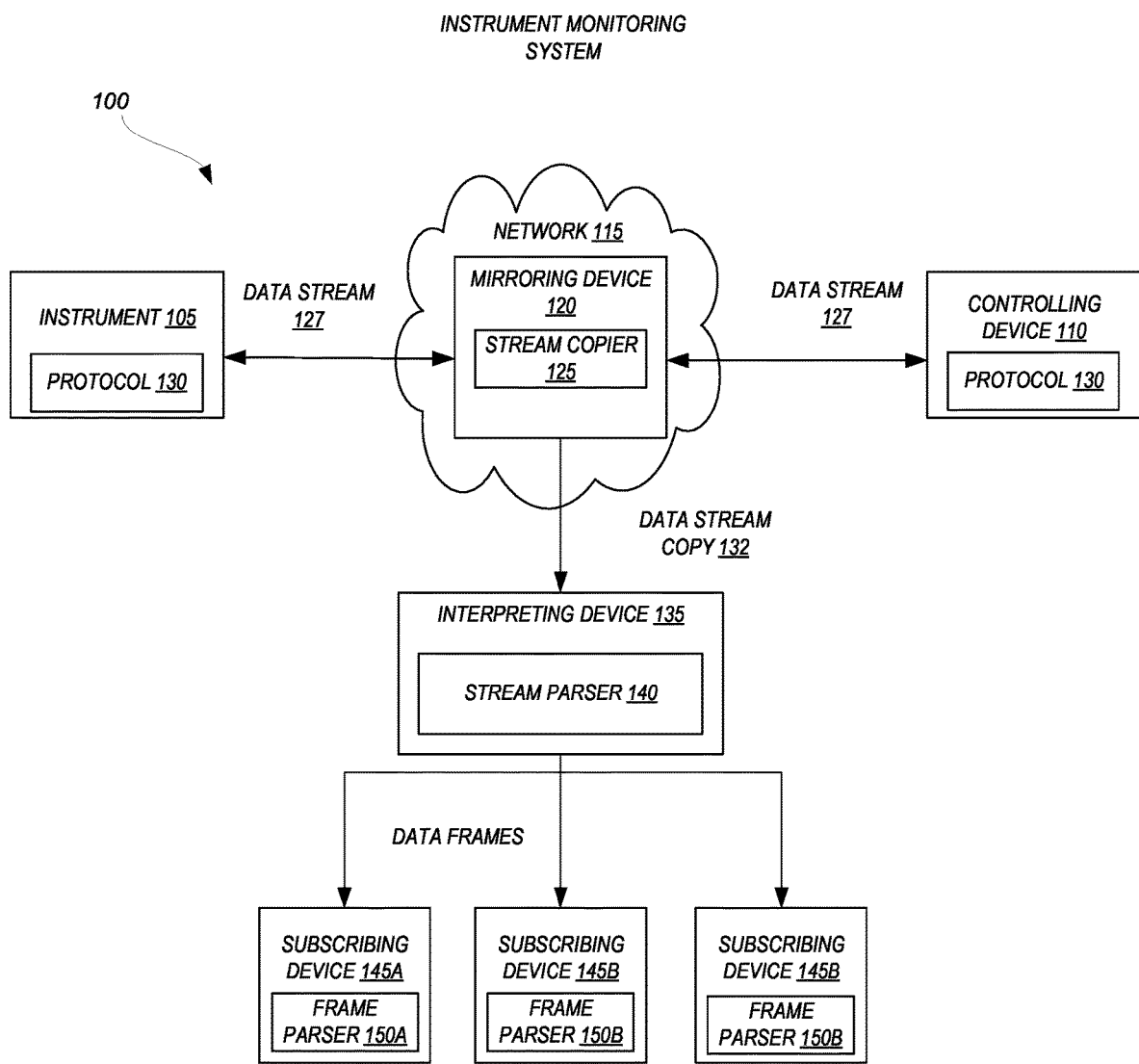
FIG. 1A is a diagram of an instrument monitoring system, in accordance with one or more embodiments.

A system of one or more computing devices can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a network device for interpreting a captured data stream. The network device can include a network interface configured to receive captured data streams, the data streams sent between an instrument and a controlling device for the instrument. The network device can also include memory coupled to the network interface, the memory configured to store the captured data streams. The network device can also include a processor configured to: receive a data stream sent by the instrument to the controlling device; and identify data frames in the data stream using a first process thread. Identifying data streams can include: searching for a first instance of a bit pattern in the data stream; identifying bits corresponding to a message length of a first presumed data frame based on a location relative to the first instance of the bit pattern; identifying a second presumed data frame in the data stream based on the message length of the first presumed data frame; determining whether a second instance of the bit pattern exists at a predicted location in the presumed second data frame; in response to identifying the second instance of the bit pattern at the predicted location, increasing a count of the bit pattern and continue scanning for the bit pattern at predicted locations in presumed data frames until a threshold for the count is reached; and in response to the threshold for the count being reached, identifying the first presumed data frame and the second presumed data frame as actual data frames. Other embodiments of this aspect include corresponding computer systems, apparatus, and computer programs recorded on one or more computer storage devices, each configured to perform the actions of the methods.

In an embodiment, identifying data frames in the data stream further comprises: in response to identifying the second instance of the bit pattern at a different location from the predicted location, starting a second process thread using the second instance at the different location as an alternate basis for framing data frames in the data stream.

In an embodiment, the bit pattern comprises 0x00000065.

In an embodiment, the bit pattern identifies a message type of the presumed first data frame. Optionally, the bits corresponding to the message length of the first presumed data frame precede bits corresponding to the message type of the first presumed data frame.

In an embodiment, a bit rate associated with the data stream is further determined by the processor as a measure or indicia of running time or utilization of the instrument.

In an embodiment, the identified data frames contain run state information for the instrument. Optimally, the run state information is used to determine running time or utilization of the instrument.

In an embodiment, the identified data frames contain data or metadata used by the processor to determine instrument operation. Optionally, the metadata contains instrument setpoints and operating values. Optionally, a comparison between setpoints and operating values is used to trigger alerts or generate visualizations.

In an embodiment, the data and metadata are collected and retained over a plurality of instrument runs. Optimally, a comparison between the data and metadata collected over a plurality of instrument runs is used to identify trends, predict events, trigger alerts and/or generate visualizations.

In an embodiment, a comparison between the data and metadata collected over a plurality of instrument runs is used to locally or remotely troubleshoot an instrument.

In an embodiment, the network device is in communication with a mirroring switch between the instrument and the controlling device. Optionally, the received data stream is mirrored from an original data stream received by the mirroring switch from at least one of the instrument and the controlling device.

In an embodiment, the network device is located between the instrument and the controlling device. Optionally, the network device may include a proxy server for facilitating communications between the instrument and the controlling device.

In an embodiment, the processor of the network device is further configured to select the bit pattern to be searched based on a known protocol used by the instrument.

One general aspect includes a method for interpreting a data stream. The method can include receiving a data stream sent by an instrument to a controlling device. The method can also include identifying data frames in the data stream using a first process thread by: searching for a first instance of a bit pattern in the data stream; identifying bits corresponding to a message length of a first presumed data frame based on a location relative to the first instance of the bit pattern; identifying a second presumed data frame in the data stream based on the message length of the first presumed data frame; determining whether a second instance of the bit pattern exists at a predicted location in the presumed second data frame; in response to identifying the second instance of the bit pattern at the predicted location, increasing a count of the bit pattern and continue scanning for the bit pattern at predicted locations in presumed data frames until a threshold for the count is reached; and in response to the threshold for the count being reached, identifying the first presumed data frame and the second presumed data frame as actual data frames. Other embodiments of this aspect include corresponding computer systems, apparatus, and computer programs recorded on one or more computer storage devices, each configured to perform the actions of the methods.

In an embodiment, identifying data frames in the data stream may include: in response to identifying the second instance of the bit pattern at a different location from the predicted location, starting a second process thread using the second instance at the different location as an alternate basis for framing data frames in the data stream.

In an embodiment, identifying data frames in the data stream may include: in response to identifying a third instance of the bit pattern at a second location different from a predicted location for the third instance, starting a third process thread using the third instance at the second location as a second alternate basis for framing data frames in the data stream.

In an embodiment, the method may include: in response to the threshold for the count being reached by one of the process threads, ending the other process threads and selecting a framing hypothesis for the data stream corresponding to the process thread where the threshold was reached.

In an embodiment, the bit pattern may include 0x00000065.

In an embodiment, the bit pattern identifies a message type of the presumed first data frame.

In an embodiment, the bits corresponding to the message length of the first presumed data frame precede bits corresponding to the message type of the first presumed data frame.

In an embodiment, the method is performed by a network device located between the instrument and the controlling device.

In an embodiment, receiving the data stream sent by the instrument may include proxying, using a proxy server, communications between the instrument and the controlling device.

In an embodiment, the method may include: determining instrument utilization from run state information collected from the identified data frames.

In an embodiment, the method may include: determining instrument utilization based on a bit rate of the data stream.

In an embodiment, the method may include: comparing setpoints and actual operating values from the identified data frames.

In an embodiment, the method may include: storing and comparing data or metadata collected the identified data frames over many instrument runs.

In an embodiment, the method may include: based on data or metadata collected from the identified data frames, at least one of identifying trends, predicting events, or and/or triggering one or more alerts based on data or metadata collected from the identified data frames.

In an embodiment, the method may include: generating visualizations based on data or metadata collected from the identified data frames.

In an embodiment, the method may include: interactively exploring data or metadata collected from the identified data frames using a graphical user interface.

In an embodiment, the method may include: locally or remotely troubleshooting an instrument based on data or metadata collected from the identified data frames.

One general aspect includes a non-transitory computer readable medium having stored thereon software instructions that when executed by a processor, cause the processor to interpret a data stream. The software instructions can include receiving a data stream sent by an instrument to a controlling device. The software instructions can include identifying data frames in the data stream using a first process thread by: searching for a first instance of a bit pattern in the data stream; identifying bits corresponding to a message length of a first presumed data frame based on a location relative to the first instance of the bit pattern; identifying a second presumed data frame in the data stream based on the message length of the first presumed data frame; determining whether a second instance of the bit pattern exists at a predicted location in the presumed second data frame; in response to identifying the second instance of the bit pattern at the predicted location, increasing a count of the bit pattern and continue scanning for the bit pattern at predicted locations in presumed data frames until a threshold for the count is reached; and in response to the threshold for the count being reached, identifying the first presumed data frame and the second presumed data frame as actual data frames. Other embodiments of this aspect include corresponding computer systems, apparatus, and computer programs recorded on one or more computer storage devices, each configured to perform the instructions.

Features which are described in the context of separate aspects and embodiments of the invention may be used together and/or be interchangeable. Similarly, features described in the context of a single embodiment may also be provided separately or in any suitable sub-combination.

DETAILED DESCRIPTION

The headings provided herein are for convenience only and do not necessarily affect the scope or meaning of disclosure. Although certain preferred embodiments and examples are disclosed below, the subject matter extends beyond the specifically disclosed embodiments to other alternative embodiments and/or uses and to modifications and equivalents thereof. Thus, the scope of the claims that may arise herefrom is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Overview

A laboratory typically contains multiple instruments for quantifying and analyzing samples. These instruments measure, transmit and sometimes store various aspects of their own operation. For example, a mass spectrometer can keep information on its run state (e.g., ready, armed, running, etc.) and transmit this information to a controlling computer. However, instruments in laboratories may be from different manufacturers or at least made during different times. Thus, any two instruments may often be using different protocols to communicate. Even two instruments from the same manufacturer can employ different protocols. In fact, even the same type of instrument from the same manufacturer may use different protocols if the instruments are from different generations. As instruments have long life spans (some lasting 20 years or more), the typical laboratory can have many instruments of varying ages that are employing different communication protocols. Furthermore, different instruments may have different limitations and some instruments may limit the number of concurrent connections or data streams, disallow new connections, and/or limit the amount or type of data that can be sent via a new connection.

Thus, there is a need for a monitoring system that can collect data from different instruments regardless of the different protocols being used, and that can support monitoring using existing connections. Certain embodiments of a monitoring system described herein provide the ability to monitor the activity of an instrument by listening to the communication line between the instrument and the controlling computer. The monitoring system can capture a data stream transmitted between the instrument and the controlling computer, which includes transmitted experimental measurements, or data, such as a total ion chromatogram (TIC), and metadata such as the pump pressure, pump drive state, rough vacuum pressure, extractor voltage, drying gas flow, gas temperature, run state, instrument setpoints, and/or other operating values/parameters of the instrument. By gathering and analyzing the captured data and metadata from the data stream, the monitoring system can ascertain operational information from the instrument. Exemplary embodiments provide a monitor that can capture both the setpoint, or target value, set by the controlling software, and the actual value, which is the point-in-time value measured by the instrument. An associated visualization may further be displayed, for example, on a dashboard updated in real-time and monitored by the operator to detect abnormal conditions, such as temperature deviations from a setpoint. In another embodiment, a system configured according to the present teachings can autonomously monitor both signals and alert the operator of any abnormal conditions.

Monitored data or metadata, such as various measurements and/or parameters, can be captured, extracted, stored and analyzed over time and/or multiple instrument runs. For example, a pump pressure value associated with a liquid chromatography (LC) column, can be captured, extracted, stored, and compared over a number of instrument runs. The comparisons could be used, for instance, to trigger an alert if the operating conditions of any run deviates significantly from those of previous runs. Furthermore, similar analyses can identify trends and/or predict future events. More precisely, various statistical techniques, some of which may be referred to as Machine Learning, can extrapolate the future behavior of a system via a model based on past behavior of the system and/or past behavior of similar systems. For example, a trend in column pressure can indicate column age and a need for column replacement. Additionally, the measurements or parameters that are captured by the monitor and stored over time can, for example, be displayed on a passive video dashboard or interactively explored via graphical user interfaces. Such interactive exploration can, for example, facilitate local or remote instrument troubleshooting. For instance, should a customer report that an instrument stopped functioning properly within the past week, support personnel can visually scan the stored history of the instrument's various measurements and/or parameters for unexpected deviations, such as a significant drop in the internal power supply voltage, to identify the moment when the problem occurred. Furthermore, by visually examining the stored history of various measurements and/or parameters before and after the moment when the problem occurred, experienced support personnel can identify the source of the problem and, for example, the relevant part that must be replaced.

Important information can be inferred or derived from the monitored data in multiple ways. For example, instrument utilization, or the relative amount of time spent performing active measurement, can be estimated via at least two methods, each based on different data captured by the monitor. For instance, the monitoring system can assess the amount of time an instrument is in a run-time or operating state, which can serve as a measure of instrument utilization or of how much instrument capacity is being used. In addition, the system can be configured to trigger alerts or generate visualizations for the collected data. For example, a comparison between setpoints and operating values can be used to trigger the alerts or can be used to generate visualizations of the compared values.

In various embodiments, captured data can still be utilized even if the data stream is in an unrecognized format or transmitted in an encrypted format. For example, instrument utilization can be inferred from or associated with the bit rate of the captured data. Furthermore, a search for recurring fingerprints, coupled with the algorithms described herein, can be configured to provide for the identification of message boundaries, message types, and/or parameter values in otherwise unrecognized or encrypted data streams.

Instrument Monitoring System

FIG. 1A is a diagram of an instrument monitoring system 100, in accordance with one or more embodiments. As shown, an instrument 105 and a controlling device 110 are connected via a network 115. The network 115 includes a mirroring device 120 that connects the instrument 105 and the controlling device 110. The mirroring device 120 can communicatively couple the instrument 105 and the controlling device 110. In some embodiments, the mirroring device 120 includes a stream copier 125 that copies the data stream (from/to the instrument and the controlling device using protocol 130) received by the mirroring device 120 and sends the copied data to the interpreting device 135. The interpreting device 135 and the stream parser 140 can then parse the copied data stream into data frames that are then sent to one or more subscribing devices 145A-145C (collectively 145). In some embodiments, the data frames include data or metadata about the instrument.

The instrument monitoring system 100 can include one or more of the above components. For example, one embodiment may include only the mirroring device 120 and the interpreting device 135, while others can include additional components. Additionally, some of the components may be combined into a single device. For example, the mirroring device 120 and the interpreting device 135 may be a single device that includes the stream copier 125 and the stream parser 140.

The instrument 105 can comprise liquid chromatographs, gas chromatographs, liquid chromatography mass spectrometers, gas chromatography mass spectrometers, inductively coupled plasma mass spectrometers, atomic absorption spectrometers, microwave plasma atomic emission spectrometers, inductively coupled plasma optical emission spectrometers, Raman spectrometers, cell analysis plate based assay systems, flow cytometers, and real-time cell analyzers. The controlling device 110 can comprise a personal computer, tablet, smart phone, server, laptop, mobile device, other type of computing device, or the like. In a typical scenario, the instrument monitoring system 100 is part of a laboratory.

The network 115 may include one or more of an ad hoc network, a peer to peer communication link, an intranet, an extranet, a virtual private network (VPN), a public network (e.g., the Internet), a private network (e.g., a local area network (LAN)), or wide area network (WAN) such as the Internet, a wired network (e.g., Ethernet network), a wireless network (e.g., an 802.11 network, a Wi-Fi network, a wireless LAN (WLAN), a wireless WAN (WWAN), etc.), a cellular network (e.g., a Long Term Evolution (LTE) network), a metropolitan area network (MAN), a portion of the Internet, a portion of the Public Switched Telephone Network (PSTN), routers, hubs, switches, server computers, other types of computer network, and/or a combination thereof. In one embodiment, the instrument 105 and controlling device 110 are located in a local area network (LAN), while the interpreting device 135 and/or subscribing devices 145A-145C are in the LAN or connected to the LAN via a wide area network (WAN).

The mirroring device 120 can be a switch, personal computer, gateway, router, or other networking device for communicatively coupling the instrument 105 with the controlling device 110. In one embodiment, the connection between the instrument and the controlling device is via a physical line, such as ethernet cable, optical cable, or the like. For example, the mirroring device 120 can be a networking switch with physical ports for receiving networking cables from the instrument and controlling device. In one embodiment, the connection is wireless, such as through Wi-Fi, Bluetooth, Z-wave, Zigbee, or the like. In some embodiments, the stream copier 125 is composed of circuitry and/or software of the mirroring device 120 for mirroring packets. After receiving a data stream 127 comprising of data packets (e.g., IP datagrams), the stream copier 125 can copy or mirror the data stream and send the data stream copy 132 to the interpreting device 135. Meanwhile, the original data stream is sent to the original destination. This mirroring functionality can be transparent to the instrument and controlling device. That is, the mirroring of packets may have no effect on communications between the instrument and controlling device, with those devices remaining unaware that mirroring is taking place.

The interpreting device 135 may be a computing device, such as a desktop, server, or the like and may be located in the laboratory or in a different location. The interpreting device 135 includes a stream parser 140 for parsing the data stream copy 132 into individual frames. Typically, internet protocol (IP) is used as the building block for many application-level protocols, such as protocol 130. Using encapsulation, protocol 130 data is converted into a lower-level protocol, such as IP, by adding the appropriate headers. IP packets include a header section and a data section. For simplicity, an IP packet data section is described as carrying protocol 130 data. However, in actuality, one or more intervening protocols (e.g., transmission control protocol (TCP)) may further encapsulate the protocol 130 data.

The data stream copy 132 is not necessarily in an understandable condition when received by the interpreting device 135. IP packets may be repeated or out of order, for example, as a result of a packet being lost or damaged. Thus, the data stream copy received by the interpreting device may have segments that are out of order, missing, damaged, and/or repeated. Therefore, identifying the data in the protocol 130 transmitted using IP packets may be difficult; simply reading the data IP packets in order from the data stream can result in a garbled message. Furthermore, it is not readily apparent from reviewing the data stream copy how the protocol data should be framed.

The stream parser 140 can use established methods to reorganize the IP packets of the copied data stream into an ordered stream. However, the stream may still be incomplete, namely lacking the initial portion, which can be necessary to identify individual data frames within the stream. The stream parser of 140 can use embodiments of an algorithm described in FIGS. 2-5 to identify individual data frames of the protocol 130 in the copied, incomplete data stream. By searching for distinctive bit patterns in the data stream, the stream parser can identify potential boundaries of data frames in the protocol 130. The stream parser 140 can then verify that the presumed boundaries are correct by determining if additional instances of the distinctive bit patterns are found in expected locations. Once additional instances are found, the stream parser 140 can assume the presumed boundaries are correct and parse the copied data stream accordingly into individual data frames of the protocol 130.

As discussed above, the interpreting device 135 can send data frames to the subscribing devices. The subscribing devices 145 may then utilize a frame parser 150A-150C (collectively 150) to extract semantic meaning, or the specific values of interest, from the data frame. The frame parser 150 can include logic that describes how data is organized in the data frames, based on the particular protocol used by the instrument. For example, the frame parser 150 can identify which bits in the data frame contain which operational data for the instrument. In some embodiments, the frame parser 150 can include logic for several protocols, allowing the frame parser 150 to obtain usable data from various lab instruments.

The subscribing devices 145A-145C can include client devices that collect information from the instrument 105. Such devices can be mobile devices, desktops, servers, or the like and may be located in the laboratory or in a different location. The subscribing devices may utilize the data for a variety of reasons. For example, a subscribing device may analyze the data frames to identify operating data of the instrument 105, such as a measure or indicia of utilization and running time. These operating data can then be used by a resource allocation application to plan and schedule usage of the instrument. In another example, the subscribing device may use the operating data to identify usage patterns and schedule low-power times (e.g., turn off or place instrument in a sleep mode) for the instrument, in order to save power consumption of the device and associated environmental power usage (e.g., cooling, lighting, vent system, etc.).

In some scenarios, run state (e.g., ready, armed, running, etc.) information can be collected by the instrument monitoring system 100. Utilization, or percentage of the time spent in each run state, can then be determined. Other data can also be collected or determined, such as Total Ion Chromatogram (TIC), a summation of each ion spectrum measured by the instrument, and Chamber Current, one of the many instrument parameters that can be set and monitored for deviation from that setpoint.

Figure 1B:
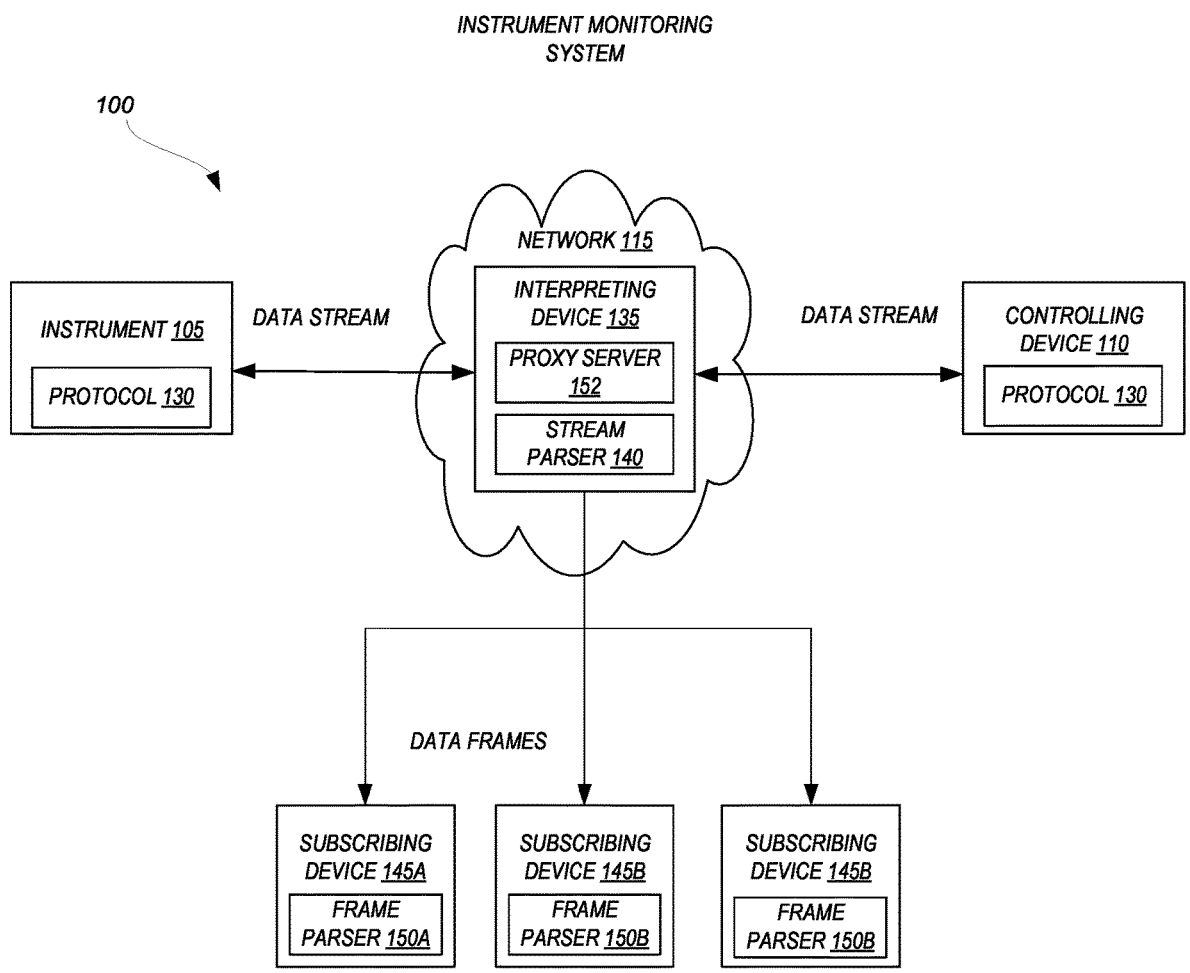
FIG. 1B is a diagram of an embodiment of the instrument monitoring system utilizing a proxy server, in accordance with one or more embodiments.

FIG. 1B is a diagram of an embodiment of the instrument monitoring system 100 utilizing a proxy server 152. FIG. 1B is similar to FIG. 1A, with the main difference that the interpreting device 135 is directly in the communication path from the instrument 105 to the controlling device 110. Thus, a mirroring device is not necessary as the interpreting device 135 can utilize a proxy server 152 to directly receive packets going to and from the instrument and the controlling device.

As shown, the instrument 105 and the controlling device 110 are connected via a network 115. The network 115 includes the interpreting device 135 that connects the instrument 105 and the controlling device 110. For example, the interpreting device 135 may incorporate ethernet ports or other communication ports for connecting to the instrument and the controlling device. The interpreting device 135 can communicatively couple the instrument 105 and the controlling device 110. In some embodiments, the interpreting device 135 includes a proxy server 152 that receives packets from the instrument and sends them to the controlling device, and vice versa.

In some embodiments, the proxy server 152 is a server application, circuitry or device that acts as an intermediary for requests from clients seeking resources or instructions from servers or other computing devices (e.g., controlling device 110) that provide those resources or instructions. A proxy server can function on behalf of the client when requesting service. Instead of connecting directly to a server that can fulfill a requested resource, such as a file or web page for example, the client directs the request to the proxy server, which evaluates the request and performs the required network transactions. Using a proxy server can simplify or control the complexity of the request, or provide additional benefits such as load balancing, privacy, or security.

Because the proxy server 152 mediates the connection between the instrument 105 and the controlling device 110, it may ensure the entire data stream is copied, including the initial portion, obviating the need for the algorithm described by FIGS. 2-5. However, if the choice is made to prioritize the throughput of the data stream 127, then during periods of heavy load, the proxy server may choose to discard part of the data stream copy 132. In that case, the stream parser 140 can use the algorithm described by FIGS. 2-5 to identify the data frames of protocol 130. The interpreting device 135 can include a stream parser 140 for parsing the data stream into individual frames. The stream parser 140 can function similarly as described in FIG. 1A. The stream parser 140 can use embodiments of an algorithm described in FIGS. 2-5 to identify individual data frames of the protocol 130 in the copied data stream. By searching for distinctive bit patterns in the data stream, the stream parser can identify potential boundaries of data frames of the protocol 130. The stream parser 140 can then verify that the presumed boundaries are correct by determining if additional instances of the distinctive bit pattern are found in expected locations. Once additional instances are found, the stream parser 140 can assume the presumed boundaries are correct and parse the copied data stream accordingly into individual data frames of the protocol 130. The stream parser 140 can send the data frames to subscribing devices 145A-145B.

The subscribing devices 145A-145C can include client devices that collect information from the instrument 105. Such devices can be mobile devices, desktops, servers, or the like and may be located in the laboratory or in a different location. The subscribing devices may utilize the data for a variety of reasons. For example, a subscribing device may analyze the data frames to identify data or metadata (e.g., operating data) of the instrument 105, such as utilization and running time. These operating data can then be used by a resource allocation application to plan and schedule usage of the instrument. In another example, the subscribing device may use the operating data to identify usage patterns and schedule low-power times (e.g., turn off or place instrument in a sleep mode) for the instrument, in order to save power consumption of the device and associated environmental power usage (e.g., cooling, lighting, vent system, etc.).

Additional Embodiments

While the above has described the instrument monitoring system 100 as having certain components, those components can be combined or separated in various embodiments. For example, the frame parser 150 may be incorporated into the interpreting device 135 so that the data within the identified frames is decoded or analyzed by the interpreting device. The interpreting device 135 may then generate reports from the data and send the reports to the subscribing devices. In another example, the stream parser 140 functionality may be combined with the proxy server 152 or the mirroring device 120 combined with the interpreting device 135.

In other embodiments, components can be separated into multiple physical devices. For example, the proxy server 152 may be a separate device from the interpreting device 135. In another example, the frame parser 150 may also be separate from the subscribing device 145. Many variations are possible in how the components of the instrument monitoring system 100 are implemented into separate or combined physical electronic devices.

Framing Process

FIGS. 2A-2F illustrate a sample search of a data stream 205 undergoing a framing process, according to certain embodiments. For illustrative purposes, an example frame format corresponding to an example application layer protocol is shown, with a particular set of and sequence of fields. The framing process can also work with other protocols that use other framing formats. For example, other protocols may have additional fields and/or fields in different sequences. Furthermore, the data stream 205 may be sent over one or more additional encapsulating protocols. For example, the framing process may be performed for an application-level protocol that is transmitted using TCP/IP protocol. The framing process can be performed by embodiments of the instrument monitoring system, such as shown in FIGS. 1A-1B.

While the following examples sometimes describe the frame in terms of "bytes," any number of bits can be used and is not necessarily limited to bytes of 8 bits. For example, the distinctive bit pattern can be less than 8 bits or a number that is not divisible by 8 (e.g., 4, 5, 6, 7, 12, 15, 23 bits, etc.). In addition, while the data stream 205 is shown as a continuous stream, at the internet/transport level (e.g., TCP/IP), there may be additional headers or encapsulations used. For example, the data stream 205 may be transported via the data portions of multiple IP frames. However, for simplicity, FIGS. 2A-2F leave out the encapsulation used for lower layers of the network stack (e.g., link layer, internet layer, transport layer, etc.).

Starting at FIG. 2A, a data stream 205 is being searched by the instrument monitoring system 100 for a distinctive bit pattern that can identify particular frames. For example, the distinctive bit pattern may correspond to a bit pattern denoting a particular message type that is defined in the header portion of a frame. In other scenarios, the distinctive bit pattern may correspond to a different field in the header or even be found in the data portion of the frame. In some embodiments, the distinctive bit patterns are 2-4 bytes in size. Larger or smaller bit patterns can also be used. At FIG. 2B, a bit pattern 210 is found that matches the distinctive bit pattern.

At FIG. 2C, the location of bits corresponding to the message length 215 field is determined based on its location respective to the bit pattern 210. The presumed header 216 can also be identified based on the bit pattern 210. In this example scenario, the message length 215 is shown immediately preceding the bit pattern 210 and the header comprises of the message length 215 field and the bit pattern 210 field. However, the header may contain additional fields containing other information, depending on the protocol. Also, the location of the message length 215 may be in different locations relative to the header, based on the particular protocol being used. For example, the message length 215 may be subsequent to the bit pattern 210 and/or not directly adjacent to the bit pattern 210. As long as the protocol is known, the location of the message length 215 relative to the bit pattern 210 can be determined.

By reading the bits in the message length 215 field, the instrument monitoring system 100 can determine the presumed message length of the presumed frame. The end of the data portion of the frame can then be determined. For example, adding the message length 215 to the end of the presumed header 216 should point to the end of the data portion 217. Typically, in most protocols, the end of the message length 215 corresponds to the end of the frame. However, as long as the protocol is known, the end of the frame can be found based on its location relative to the data portion. For example, if X bytes are found after the data portion of a frame of a particular protocol, then the end of the frame can be found by adding X bytes to the end of the data portion 217.

At FIG. 2D, the message length 215 is used to determine where the data portion of the frame ends. In this example scenario, the data portion begins after the bit pattern 210 and the end of the data portion is found by adding the message length to the end of the bit pattern 210. For example, assuming the message length is 10 bytes and bit pattern 210 ends at byte no. 30, the end of the message 220 is determined to be at byte no. 40 (30+10). However, in other scenarios, the data portion may be some offset number of bytes after the bit pattern 210, based on the particular protocol being used. As long as the protocol is known, the end of the data portion can be determined based on the known starting position of the data portion relative to the bit pattern 210.

With the header portion and the data portion of the first frame identified, the limits of the presumed first frame 225 are now known. It is a presumed frame until additional verification is obtained by finding additional frames in the expected locations based on the location of the first frame. While the bit pattern being searched for is distinctive, it is not necessarily uniquely found in a particular location of a frame header. For example, the bit pattern may be found in the data portion of a frame as part of a larger message.

At FIG. 2E, an offset is calculated based on where the next instance of bit pattern 230 is expected to appear in the data stream. For example, if the protocol has the bit pattern in the start of frames, then the offset should be 0 as the bit pattern 230 should appear immediately after the presumed first. If additional fields are contained in the protocol header before the field (e.g., message type field) containing the bit pattern 230, then the offset will be a positive number equal to the number of bytes preceding the field containing the bit pattern 230. Adding the offset to the end of the presumed first frame should get to the location of the next presumed bit pattern 227. The instrument monitoring system 100 can then check whether the bit pattern 230 is actually found at the presumed location.

At FIG. 2F, the bit pattern 230 matches the distinctive bit pattern, causing the instrument monitoring system 100 to assume the boundaries of the second frame 245. For example, the boundaries of the presumed second header 237 can be calculated its relative location to the bit pattern 230, as described above. The message length 235 field of the second frame can also be identified based on the location relative to the bit pattern 230. The boundaries of the message 240 can then be determined based on the message length 235 and its position relative to the bit pattern 230, as described above. The process can then repeat as described earlier to find the next bit pattern 250 by calculating an offset and looking at the expected location 247 for the next bit pattern 250.

The above scenario has assumed a particular layout used by a hypothetical protocol. As will be apparent, the above process can be modified to work with a variety of protocols. Most protocols have a fixed portion (e.g., the header) and a variable portion (e.g. the message). As the header is fixed, once a known field of the header is located, the boundaries of the header can be calculated based on its relative position to the known field. The header should also contain the length of the variable portion. By adding the variable length to the location of the start of the variable portion (typically found after the header), the boundaries of the entire frame can be determined. Thus, as long as the protocol is known and a known field is found, the boundaries of the frame can be identified.

FIGS. 3A-3B illustrate a sample search that fails to find the distinctive bit pattern in the expected location in a data stream 305, according to certain embodiments. FIG. 3A illustrates a similar scenario to FIG. 2E, where the presumed N'th frame 325 has been identified and the instrument monitoring system 100 is checking if the next instance of the bit pattern 330 is in the expected location 327. FIG. 3B illustrates that the bit pattern 330 was not found in the expected location 327. This may be expected, as not every data frame may contain the distinguishing bit pattern, although future data frames may. As such, the thread continues as normal, framing the N+1'th data frame, and searching for the expected bit pattern in the N+2'th location.

In one embodiment, a master thread finds the bit pattern 310 at a given location. Subsequently, the instrument monitoring system 100 can create a framing thread that follows the algorithm described in FIGS. 2A-3B, though other embodiments of the framing thread may perform only some of the algorithm. The framing thread continues searching the data stream 305 with a first framing hypothesis based on the location of the bit pattern 310, checking if the distinctive bit pattern can be found at the next expected location predicted by the first framing hypothesis. The master thread continues to search the data stream for the bit pattern based on the first framing hypothesis. If the master thread finds a second bit pattern 332 at a given location different from an expected location 327 of the first thread, the master thread launches a second framing thread that begins searching the data stream 305 using an alternate framing positioning or hypothesis relative to the first framing thread, as shown in FIGS. 4A-4B.

By searching the data stream 305 with the alternate framing hypothesis, the second framing thread tests another possible way that the data stream is framed. The first framing thread and the second framing thread can then continue searching until one of the threads finds a number of distinctive bit patterns in the expected locations above a particular threshold. The framing thread that meets the threshold can be presumed to have correctly found the boundaries for the frames in the data stream 305.

FIGS. 4A-4B illustrate a sample search using the alternate framing by the second framing thread, according to certain embodiments. FIG. 4A illustrates the second thread testing the second framing hypothesis for the data stream 305, using the location of the bit pattern 332 to determine expected locations of other bit patterns. As described above, if the protocol is known, the instrument monitoring system 100 can identify the header portion and the message portion of a frame based on the relative position to the bit pattern 332.

FIG. 4B illustrates the second thread identifying the message length 335 field based on its relative position to the bit pattern 332. The message length 335 can then be used to identify the message 340 portion of the frame. With the header portion and the message portion of the frame known, the boundaries of a presumed first frame 345 is found. This framing hypothesis on how the data stream 305 is framed is then tested by searching for corroborating instances of the distinctive bit pattern. By testing different framing hypothesis in the first thread and the second thread, the instrument monitoring system 100 increases the chances that the correct framing boundaries can be found. Additional threads can be generated to test additional framing hypothesis for any or all unexpected bit patterns that are found.

The second framing thread can then continue searching the data stream 305 using the alternative framing boundaries based on the boundaries of the presumed first frame 345. For example, in a process similar to that described in FIGS. 2E-2F, the second thread can search for subsequent bit patterns in expected locations based on the offset from the ending boundary of the first frame 345. In some embodiments, the second thread searches the data stream 305 backwards, as well as forwards, for instances of the bit pattern.

FIG. 5A illustrates a flow diagram illustrating an example process 500 for framing a data stream, according to certain embodiments. The process can be performed by the instrument monitoring system 100 or one of its components, such as the mirroring device 120 or interpreting device 135. The instrument monitoring system 100 can comprise processing logic that includes hardware (e.g., circuitry, dedicated logic, programmable logic, microcode, etc.), software (e.g., instructions run on a processor to perform hardware simulation), firmware, or a combination thereof. In one embodiment, the process 500 is performed by a master thread that creates one or more framing threads. However, other embodiments can utilize a single thread or can use multiple threads without having a designated master thread.

At block 505, the instrument monitoring system 100 receives a copy of a data stream, the data stream being sent between an instrument and a controlling device. The instrument and controlling device may be in a laboratory or other facility for testing products and/or substances. The data stream may be intercepted by a mirroring device or received by a proxy server 152 of the instrument monitoring system.

At block 510, the instrument monitoring system 100 searches for and identifies instances of a distinctive bit pattern, such as described in FIG. 2A. Preferentially, the distinctive bit pattern is selected for the search because it appears fairly often in the data stream where expected, but relatively less frequently at other positions. For example, the distinctive bit pattern may be a particular message type number, appearing in the message header, that is commonly sent by an instrument, but is relatively unlikely to appear in the message body. That way, there are sufficient samples that can be found in the data stream to verify a framing hypothesis relatively quickly, without an overwhelming number of false starts.

In some embodiments, instrument monitoring system 100 includes a table or other data structure of protocols and corresponding distinctive bit patterns. Depending on the protocol found in the data stream, the appropriate distinctive bit pattern is selected from the table. In some embodiments, the distinctive bit pattern may be identified by analyzing captures of various protocols and identifying bit patterns that appear in set locations in the frame and at an appropriate frequency.

At block 515, the instrument monitoring system 100 determines if one or more bit patterns were found at unexpected locations. If yes, the process 500 continues to block 520. If no, the process 500 continue to block 525. In situations where no bit patterns are found at unexpected locations, the master thread may create no additional threads, instead acting as a framing thread for the data stream. For example, the master thread may perform one or more steps of the framing thread process 550 described in FIG. 5B.

At block 520 when a bit pattern is found in an unexpected location, instrument monitoring system 100 optionally creates a new thread with an alternate framing hypothesis. For example, a master thread may create one or more framing threads to test one or more framing hypotheses. FIGS. 3A-3B and FIGS. 4A-4C illustrates one example scenario of creating a new thread. Creating new threads allows different framing hypothesis to be tested in parallel, speeding up the process 500 of testing framing hypothesis. In some situations, multiple bit patterns may be found in unexpected locations and a new thread is created for each instance of the bit pattern that is found in an unexpected location. However, creating new threads is not mandatory. For example, different framing hypothesis can be tested serially using only one thread.

At block 525, the instrument monitoring system 100 proceeds with framing the rest of the data stream. In one embodiment, framing proceeds as described in FIGS. 2A-2F, with the first instance of the bit pattern used to find the boundaries of the first frame and the next subsequent frame.

At block 530, the instrument monitoring system 100 can proceed back to block 520 to search for additional instances of the bit pattern. Otherwise, If the entire data stream is processed, the process 500 can end.

Figure 5B:
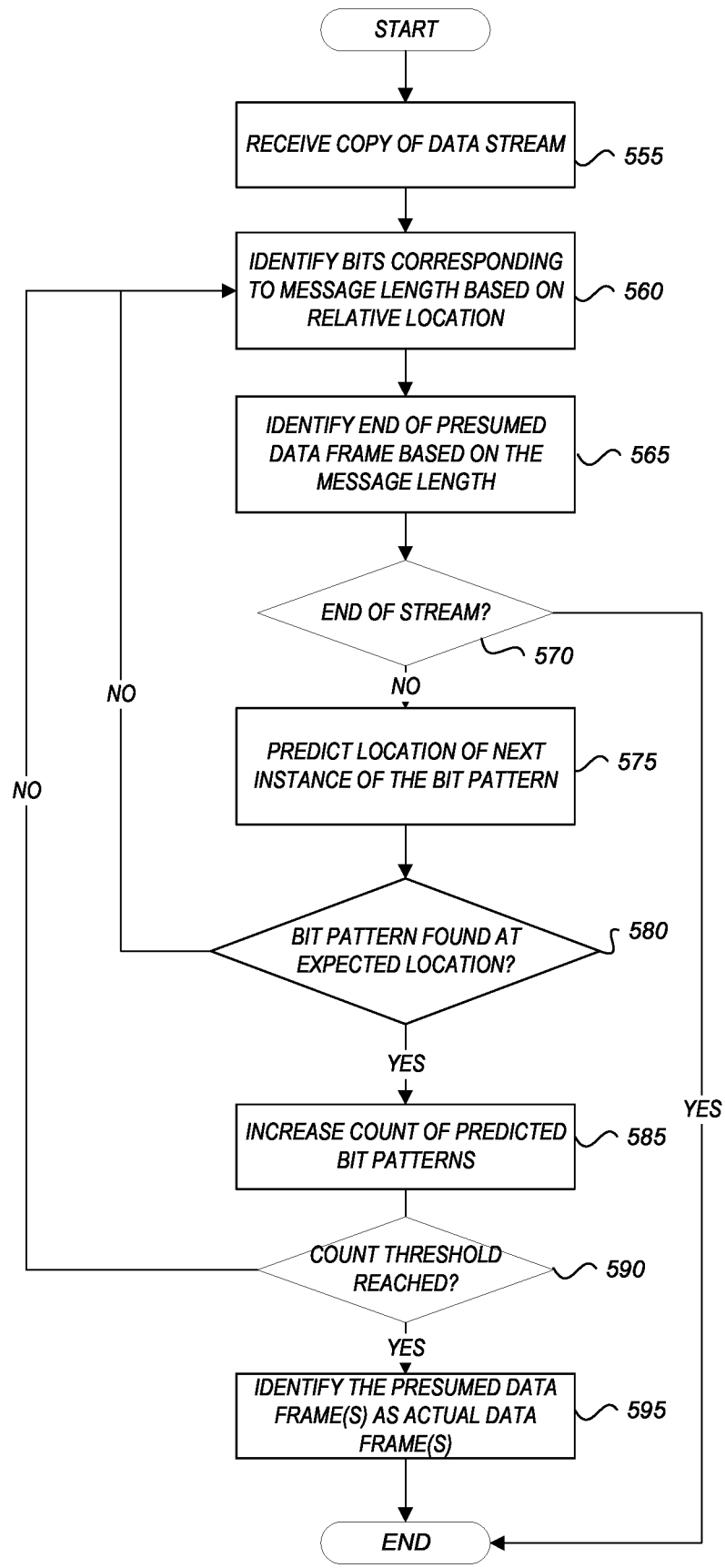
FIG. 5B illustrates a flow diagram illustrating an example process for continuing the framing process from a starting bit pattern, in accordance with one or more embodiments.

FIG. 5B illustrates a flow diagram illustrating an example process 550 for continuing the framing process from a starting bit pattern. In some embodiments, the process 550 is performed by one or more framing threads (running on the instrument monitoring system 100) created by the master thread described in FIG. 5A, particularly in block 520, to test various framing hypothesis. The process can be performed by the instrument monitoring system 100 or one of its components, such as the mirroring device 120 or interpreting device 135. The instrument monitoring system 100 can comprise processing logic that includes hardware (e.g., circuitry, dedicated logic, programmable logic, microcode, etc.), software (e.g., instructions run on a processor to perform hardware simulation), firmware, or a combination thereof. For ease of explanation, the following describes the process 550 as being performed by a framing thread, which may be running on the instrument monitoring system 100 or one of its components. However, the process 550 is not limited to being performed only by framing threads. For example, the master thread could perform some or all of the steps.

At block 555, the framing thread receives a copy of the data stream. In one embodiment, the data stream is a partial copy starting from the instance of the bit pattern that was found in an unexpected location, as described in block 520 of FIG. 5A. Receiving a copy may involve receiving a complete copy of the data stream or receiving a pointer to the same copy of the data stream being processed by the master thread rather than a separate copy.

At block 560, the framing thread identifies bits corresponding to the message length field based on its relative location to the instance of the bit pattern or the boundary of the last identified frame. FIG. 2B describes one example scenario. The distinctive bit patterns may comprise a field denoting the type of data in the message. For example, the bit pattern may be 0x00000065, which in one protocol indicates that the data frame encapsulates a spectrum measured by the instrument. In some scenarios, there may be instances of the distinctive bit pattern that appear by coincidence, for example, being included in the message rather than part of the header. However, the instrument monitoring system 100 can try multiple framing hypothesis until a correct one is found. The correct framing hypothesis is indicated by subsequent distinctive bit patterns appearing most often in expected places. Incorrect framing hypotheses can then be eliminated in favor of the correct framing hypothesis.

At block 565, the framing thread identifies the end of the presumed data frame based on the message length. FIG. 2D illustrates one example scenario.

At block 570, the framing thread checks if the end of the data stream has been reached. If yes, the process 550 ends. If no, the process 550 continues to block 575.

At block 575, the framing thread predicts the location of the next instance of the bit pattern. FIG. 2E illustrates one example scenario. As discussed in FIG. 2E, an offset can be calculated and added to the previously identified end of the presumed data frame to determine the expected location of the bit pattern.

At block 580, the framing thread checks if the bit pattern is found at the expected location. If the bit pattern is not found at the expected location, the process 550 returns to block 560. If the bit pattern is found at the expected location, the process 550 continues to block 585.

In some scenarios, additional frames that do not contain the bit pattern may lie between the last frame with the bit pattern and the next frame with the bit pattern. For example, assuming the distinctive bit pattern is a message type, the frames found between the instances may be of different message types that do not have a message type that matches the distinctive bit pattern. The boundaries of these frames can be identified by finding the message length field relative to the end of the last presumed frame. If the protocol is known then the header layout is also known, and the message length field can be found in the header. The process can then identify the current frame boundaries by using the message length to identify the data portion of the frame. Then, the next frame can be checked for the distinctive bit pattern. The instrument monitoring system 100 can continue framing the data stream according to the current framing hypothesis until an instance of the distinctive bit pattern is found.

At block 585, the framing thread increases a count of predicted bit patterns that have been found. Finding bit patterns at expected locations indicates the framing hypothesis being tested is likely to be correct. The greater number of bit patterns found in the expected locations, the greater the likelihood of correctness.

At block 590, the framing thread checks if the count threshold has been reached. The count threshold corresponds to the desired number of bit patterns to be found. If the count threshold is reached, the process 550 continues to block 595. If the threshold is not reached, the process returns to block 560. Depending on the implementation, the count threshold may be reached if the count is equal to and greater than or only if greater than the threshold. In other implementations, the threshold counter may start at a set number corresponding to the desired number of bit patterns to be found and be decremented until a target number (e.g., zero) is reached.

In some embodiments, the count threshold is a number from 4-8. However, the count threshold can be more or less depending on a variety of factors. For example, if the distinctive bit pattern is relatively rare, then a small number of bit patterns found can be enough to indicate that the framing hypothesis is correct. In one scenario, the data stream comprises hundreds of frames, with the distinctive bit pattern appearing in 1-5% of the frames. As will be apparent, other embodiments can use distinctive bit patterns that are more common or less common. Picking a relatively rare bit pattern can reduce the number of false positives, as the bit pattern is unlikely to appear except in the expected header field. However, picking a very rare bit pattern can increase the number of frames in the data stream that need to be captured before a framing analysis can be concluded.

At block 595, the count threshold was reached and the framing thread identifies the presumed data frame(s) as actual data frame(s). Reaching the count threshold indicates that the framing hypothesis is likely correct. The frames identified in the data stream are then provided to subscribing devices or programs. The framing process 550 can then end, having identified a likely correct framing hypothesis. The instrument monitoring system 100 can then proceed with framing the rest of the data stream with the identified framing hypothesis.

Going back to block 560, if the count threshold is not reached or the bit pattern is found at an unexpected location, the framing thread predicts the location of the next instance of the bit pattern according to the current framing hypothesis. For example, the framing thread can use the boundary of the last identified frame to identify the message length field of the next frame. The process 550 then proceeds to block 565 and repeats the procedures described above.

Figure 6:
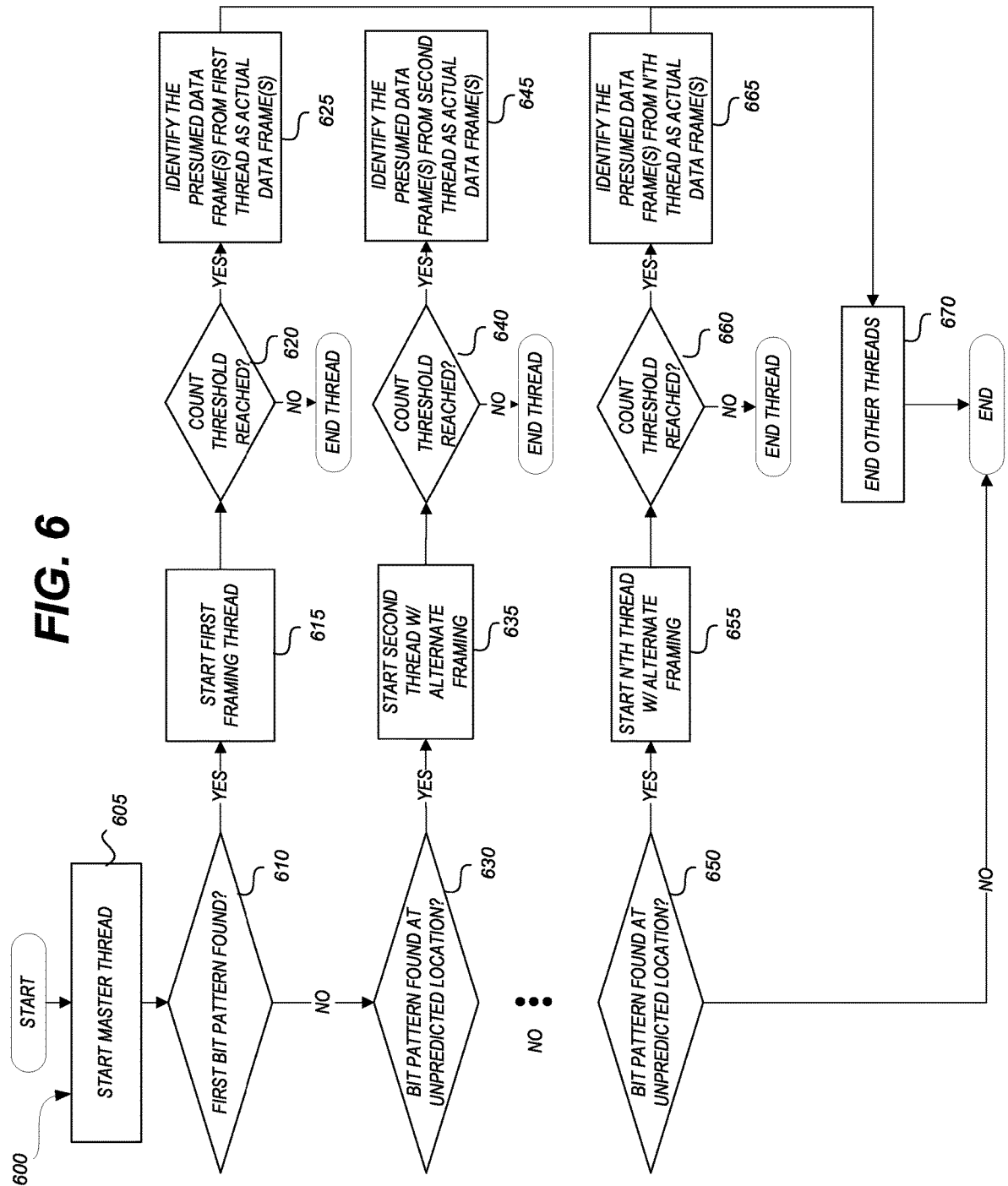
FIG. 6 illustrates a flow diagram illustrating an example process for testing framing hypotheses in parallel, in accordance with one or more embodiments.

FIG. 6 illustrates a flow diagram illustrating an example process 600 for testing framing hypotheses in parallel, according to certain embodiments. The process can be performed by the instrument monitoring system 100 or one of its components, such as the mirroring device 120 or interpreting device 135. The instrument monitoring system 100 can comprise processing logic that includes hardware (e.g., circuitry, dedicated logic, programmable logic, microcode, etc.), software (e.g., instructions run on a processor to perform hardware simulation), firmware, or a combination thereof. In the following example scenario, the process 600 utilizes multiple threads in parallel to check multiple framing hypotheses. The threads may be physical threads assigned to distinct CPU cores or may be virtual threads. For example, one physical thread may run multiple virtual threads and keep the data (e.g., threshold count) and mapping of the different virtual threads.

At block 605, the instrument monitoring system 100 starts a master thread for finding initial bit patterns that are used to initiate framing threads that will test different framing hypotheses for a data stream, as discussed in FIG. 4.

At block 610, the master thread determines if a first instance of a distinctive bit pattern is found. If the first bit pattern is found, the process 600 continues to block 615, where the location of that first bit pattern is used to find the boundaries of a first frame by the first framing thread. Meanwhile, the master thread continues to block 630, subsequently finding and processing additional frames based on the boundary of the first frame. While processing the data stream, the master thread searches for additional instances of the distinctive bit pattern in order to confirm whether the primary framing hypothesis is correct.

At block 630, master thread finds an unpredicted instance of the bit pattern, that is instances of the bit pattern in locations that are not expected by the first framing thread. If additional instances of the bit pattern are found at unpredicted locations, the master thread starts additional threads to test the alternate framing hypothesis represented by the locations of instances of the bit pattern, as shown in blocks 635 and 655. For example, assuming an N'th bit pattern is found at an unpredicted location, the master thread at block 655 start the N'th thread with the N'th alternate framing hypothesis.

However, if no instances of the bit pattern are found at unpredicted locations, and the end of the stream is reached, the master thread ends.

As described above, the master thread creates a separate thread to test the first framing hypothesis. The master thread then subsequently collects results from the one or more created framing threads and identifies the best framing hypothesis. However, other embodiments can have the master thread testing the first framing hypothesis itself and only creating additional threads to test alternate framing hypothesis. For example, in a situation where no bit patterns are found in unpredicted locations, the process 600 may be completed by a single master thread.

Going back to block 615, the instrument monitoring system 100 starts the first framing thread with the first framing hypothesis based on the location of the first found bit pattern ("BP #1"). Using the location of BP #1, the instrument monitoring system 100 identifies a header position and data portion of a presumed frame. The first framing thread then continues finding other frames in the data stream based on the presumed frame. The instrument monitoring system 100 searches for additional instances of the bit pattern in expected locations based on the first framing hypothesis.

At block 620, the first framing thread determines if the count threshold is reached based on the number of bit patterns found in expected locations. If the count threshold is reached, the process 600 continues to block 625 and the instrument monitoring system 100 identifies the presumed data frame(s) from the first framing thread as actual data frame(s). As the first hypothesis found sufficient instances of the bit pattern to corroborate the first framing hypothesis, the process 600 can continue to block 670. Otherwise, if the count threshold is not reached at block 620 and the end of the data stream is reached, the thread ends.

At block 670, the instrument monitoring system 100 may also end any other threads that might have been started. As those threads failed to reach the required count threshold, the alternate framing hypothesis tested by those threads were likely incorrect. However, in some embodiments, the other threads continue, and the results of the threads are compared to identify the most likely correct framing hypothesis. For example, the thread with the highest count of distinctive bit pattern found in expected locations may be selected as the correct framing hypothesis.

Going back to block 630, if the master thread of the instrument monitoring system 100 finds a second instance of the distinctive bit pattern at an unpredicted location, it proceeds to block 635 and starts a second framing thread. If no bit patterns are found in unpredicted locations, the master thread continues processing the data stream.

At block 635, the instrument monitoring system 100 starts the second framing thread with the second framing hypothesis based on the location of the bit pattern ("BP #2") found in the unpredicted location. Using the location of BP #2, the second framing thread identifies a header position and data portion of a presumed frame. The second framing thread then continues finding other frames in the data stream based on the presumed frame. The instrument monitoring system 100 searches for additional instances of the bit pattern in expected locations based on the second framing hypothesis.

At block 640, the second framing thread determines if the count threshold is reached based on the number of bit patterns found in expected locations. If the count threshold is reached, the process 600 continues to block 645 and the instrument monitoring system 100 identifies the presumed data frame(s) from the second framing thread as actual data frame(s). As the second framing thread found sufficient instances of the bit pattern to corroborate the second framing hypothesis, the process 600 can proceed to block 670. Otherwise, if the count threshold is not reached at block 640 and the end of the data stream is reached, the second framing thread ends.

Going back to block 650, if the master thread of the instrument monitoring system 100 finds an N'th instance of the distinctive bit pattern, it proceeds to block 655 and starts an N'th framing thread. If no bit patterns are found in unpredicted locations, the master thread continues processing the data stream until the end of the data stream is reached, at which point the master thread ends.

At block 655, the instrument monitoring system 100 starts the N'th framing thread with the N'th alternate framing hypothesis ("N'th framing hypothesis") based on the location of the bit pattern ("BP #N") found in the unpredicted location. Using the location of BP #N, the N'th framing thread identifies a header position and data portion of a presumed frame. The N'th framing thread then continues finding other frames in the data stream based on the presumed frame. The instrument monitoring system 100 searches for additional instances of the bit pattern in expected locations based on the N'th framing hypothesis.

At block 660, the N'th framing thread determines if the count threshold is reached based on the number of bit patterns found in expected locations. If the count threshold is reached, the process 600 proceeds to block 665 and the instrument monitoring system 100 identifies the presumed data frame(s) from the N'th framing thread as actual data frame(s). As the N'th framing thread found sufficient instances of the bit pattern to corroborate the N'th framing hypothesis, the process 600 can proceed to block 670. Otherwise, if the count threshold is not reached at block 620 and the end of the data stream is reached, the N'th framing thread ends.

The above has described the process using a master thread, a first framing thread, a second framing thread, and an Nth framing thread. For convenience, the above uses "N" to refer to a variable, positive number of threads. Based on the number of instances of the distinctive bit patterns and their locations, any number of threads can be generated in the process 600. For example, if no unpredicted instances of the bit pattern are found, then only the master thread is generated. If two or three instances of the bit pattern are found in unpredicted locations, then two or three framing threads are generated. The more instances of the bit patterns that are found in unpredicted locations, the more threads are generated to test out additional framing hypothesis.

Computing Device Embodiments

Figure 7:
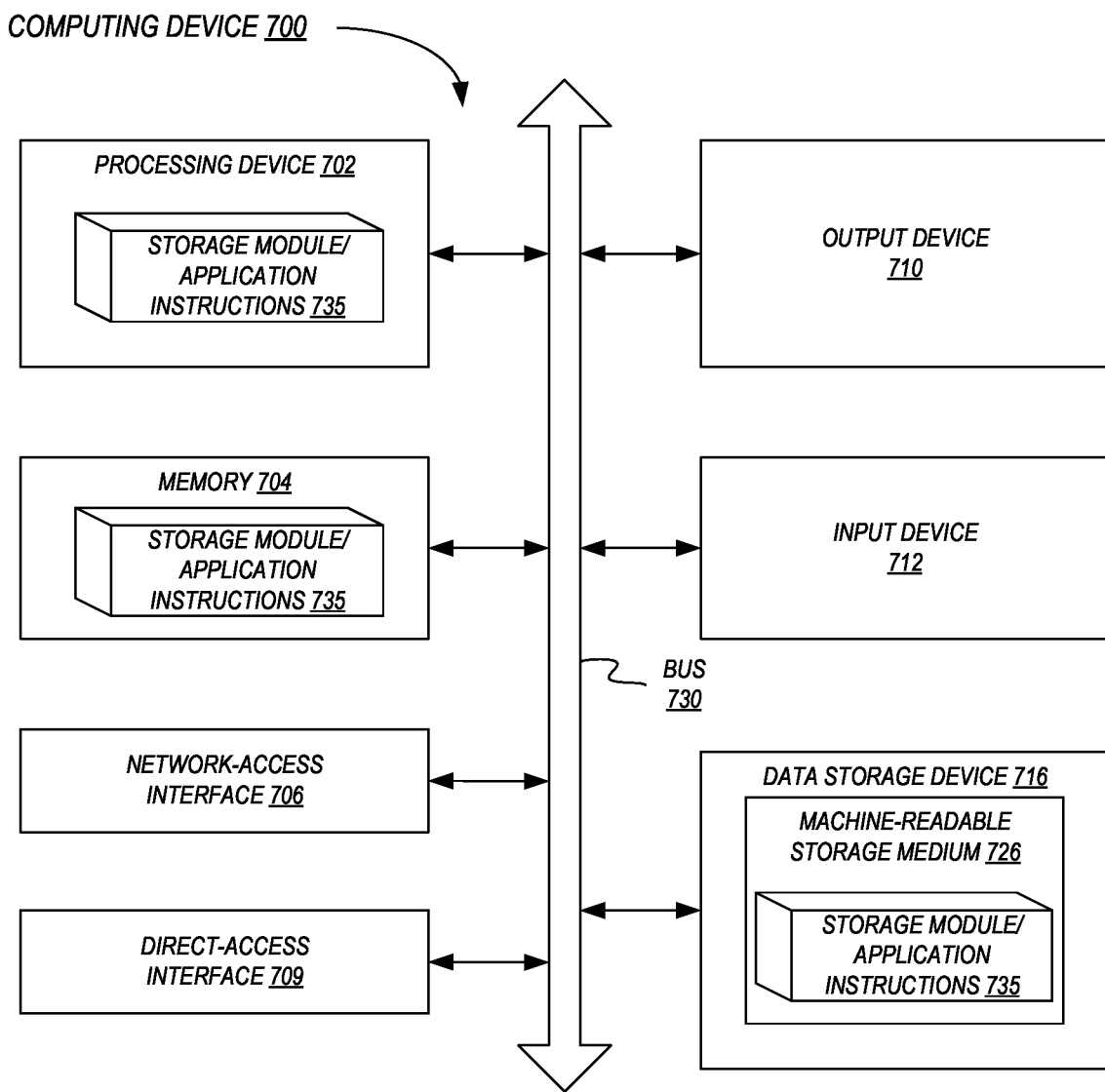
FIG. 7 is a diagram of a computing device, in accordance with one or more embodiments.

FIG. 7 is a diagram of a computing device 700, in accordance with one or more embodiments. The instrument monitoring system 100 can be formed by one or more computing devices 700. For example, the instrument 105, controlling device, 110 the mirroring device 120, interpreting device 135 and/or the subscribing devices 145a-145c may be computing devices 700. The computing device 700 may execute instructions that may cause the computing device 700 to perform any one or more of the methodologies (e.g., operations, methods, functions, etc.) discussed herein, may be executed.

The computing device 700 may be a laboratory instrument, mobile phone, a smart phone, a rackmount server, a router computer, a server computer, a personal computer, a mainframe computer, a laptop computer, a tablet computer, a desktop computer, a networked attached storage (NAS) device, a network switch, machine, etc., within which a set of instructions, for causing the machine to perform any one or more of the methodologies discussed herein, may be executed. The machine may also be any machine/device capable of executing a set of instructions (sequential or otherwise) that specify actions to be taken by that machine/device. In alternative embodiments, the machine may be connected (e.g., networked) to other machines in a LAN, an intranet, an extranet, or the Internet. The machine may operate in the capacity of a server machine in client-server network environment. Further, while only a single machine is illustrated, the term "machine" shall also be taken to include any collection of machines that individually or jointly execute a set (or multiple sets) of instructions to perform any one or more of the functions, operations, methods, algorithms, etc., discussed herein. For example, the instrument monitoring system 100 may comprises several machines collectively working to perform the framing functions described above.

The example computing device 700 includes a processing device (e.g., a processor, a controller, a central processing unit (CPU), etc.) 702, a main memory 704 (e.g., read-only memory (ROM), flash memory, dynamic random access memory (DRAM) such as synchronous DRAM (SDRAM)), a network-access interface 706, a direct-access interface 709, an output device, 710, an input device 712, and a data storage device 716, which communicate with each other via a bus 730. The computing device 700 may also include specialized hardware (not shown) for quantifying and analyzing the physical and biological properties of substances and products, as well as interrogating samples at the molecular and cellular level.

Processing device 702 represents one or more general-purpose processing devices such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 702 may also be one or more special-purpose processing devices such as an application specific integrated circuit (ASIC), a field programmable gate array (FPGA), a digital signal processor (DSP), network processor, or the like. The processing device 702 is configured to execute storage module/application instructions 735 (e.g., instructions for the storage module 126, storage module 136, and/or storage application 111 illustrated in FIG. 1) for performing the operations and steps discussed herein.

The computing device 700 may include a network-access interface 706 (e.g., a network interface card, a Wi-Fi interface, etc.) which may communicate with a network (e.g., network 170 illustrated in FIG. 1). The computing device may also include a direct-access interface 709 (e.g., a universal serial bus (USB) interface, an external SATA (eSATA) interface, a Thunderbolt interface, etc.). The computing device 700 also may include an output device 710 (e.g., a liquid crystal display (LCD) or a cathode ray tube (CRT)), and an input device 712 (e.g., a mouse, a keyboard, etc.). In one embodiment, the output device 710 and the input device 712 may be combined into a single component or device (e.g., an LCD touch screen).

The data storage device 716 may include a computer-readable storage medium 726 on which is stored one or more sets of instructions (e.g., storage module/application instructions 735) embodying any one or more of the methodologies or functions described herein. The storage module/application instructions 735 may also reside, completely or at least partially, within the main memory 704 and/or within the processing device 702 during execution thereof by the computing device 700. The main memory 704 and the processing device 702 may also constitute computer-readable media. The instructions may further be transmitted or received over via the network-access interface 706 and/or direct-access interface 709.

While the computer-readable storage medium 726 is shown in an example embodiment to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media and magnetic media.

General Comments

Those skilled in the art will appreciate that in some embodiments, other types of monitoring systems can be implemented while remaining within the scope of the present disclosure. In addition, the actual steps taken in the processes discussed herein may differ from those described or shown in the figures. Depending on the embodiment, certain of the steps described above may be removed, others may be added.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, application-specific integrated circuit (ASIC), field-programmable gate array (FPGA), and/or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc., as used herein are meant as labels to distinguish among different elements and may not necessarily have an ordinal meaning according to their numerical designation.

All of the processes described above may be embodied in, and fully automated via, software code modules executed by one or more general purpose or special purpose computers or processors. The code modules may be stored on any type of computer-readable medium (e.g., a non-transitory computer-readable medium) or other computer storage device or collection of storage devices. Some or all of the methods may alternatively be embodied in specialized computer hardware.

What is claimed is:

1. A network device for interpreting a first data stream, the network device comprising:
   a network interface configured to receive captured data streams including the first data stream, the captured data streams sent between an instrument and a controlling device for the instrument;
   memory coupled to the network interface, the memory configured to store the captured data streams; and
   a processor configured to:
      receive the first data stream sent by the instrument to the controlling device; and
      identify data frames in the first data stream using a first process thread by:
         searching for a first instance of a bit pattern in the first data stream;
         identifying bits corresponding to a message length of a first presumed data frame based on a location relative to the first instance of the bit pattern;
         identifying a second presumed data frame in the first data stream based on the message length of the first presumed data frame;
         determining whether a second instance of the bit pattern exists at a predicted location in the second presumed data frame;
         in response to identifying the second instance of the bit pattern at the predicted location, increasing a count of the bit pattern and continue scanning for the bit pattern at predicted locations in presumed data frames until a threshold for the count is reached; and in response to the threshold for the count being reached, identify the first presumed data frame and the second presumed data frame as actual identified data frames.

2. The network device of claim 1, wherein said identifying the data frames in the first data stream further comprises:

in response to said identifying the second instance of the bit pattern at a different location from the predicted location, starting a second process thread using the second instance at the different location as an alternate basis for framing the data frames in the first data stream.

3. The network device of claim 1, wherein the bit pattern identifies a message type of the first presumed data frame.

4. The network device of claim 3, wherein the bits corresponding to the message length of the first presumed data frame precede bits corresponding to the message type of the first presumed data frame.

5. The network device of claim 1, wherein a bit rate associated with the first data stream is further determined by the processor as a measure or indicia of running time or utilization of the instrument.

6. The network device of claim 1, wherein the identified data frames in the first data stream contain run state information for the instrument and the run state information is used to determine running time or utilization of the instrument.

7. The network device of claim 1, wherein the identified data frames in the first data stream contain data or metadata used by the processor to determine instrument operation, including instrument setpoints and operating values.

8. The network device of claim 7, wherein a comparison between the instrument setpoints and the operating values is used to trigger alerts or generate visualizations.

9. The network device of claim 7, wherein a comparison between the data and the metadata of the identified data frames in the first data stream collected over a plurality of instrument runs is used to trigger alerts or generate visualizations.

10. The network device of claim 1, wherein:

the network device is in communication with a mirroring switch between the instrument and the controlling device; and the first data stream is mirrored from an original data stream received by the mirroring switch from at least one of the instrument and the controlling device.

11. The network device of claim 1, wherein the network device is located between the instrument and the controlling device and the network device comprises a proxy server for facilitating communications between the instrument and the controlling device.

12. The network device of claim 1, the processor further configured to select the bit pattern to be searched based on a known protocol used by the instrument.

13. A method for interpreting a data stream, the method comprising:

receiving the data stream sent by an instrument to a controlling device; and identifying data frames in the data stream using a first process thread by:

searching for a first instance of a bit pattern in the data stream;

identifying bits corresponding to a message length of a first presumed data frame based on a location relative to the first instance of the bit pattern;

identifying a second presumed data frame in the data stream based on the message length of the first presumed data frame;

determining whether a second instance of the bit pattern exists at a predicted location in the second presumed data frame;

in response to identifying the second instance of the bit pattern at the predicted location, increasing a count of the bit pattern and continue scanning for the bit pattern at predicted locations in presumed data frames until a threshold for the count is reached; and in response to the threshold for the count being reached, identify the first presumed data frame and the second presumed data frame as actual identified data frames.

14. The method of claim 13, wherein said identifying the data frames in the data stream further comprises:

in response to said identifying the second instance of the bit pattern at a different location from the predicted location, starting a second process thread using the second instance at the different location as an alternate basis for framing the data frames in the data stream.

15. The method of claim 14, wherein said identifying the data frames in the data stream further comprises:

in response to identifying a third instance of the bit pattern at a second location different from a third predicted location for the third instance, starting a third process thread using the third instance at the second location as a second alternate basis for framing the data frames in the data stream.

16. The method of claim 15, further comprising:

in response to the threshold for the count being reached by one of the first, the second and the third process threads, selecting a framing hypothesis for the data stream corresponding to the one of the first, the second and the third process threads where the threshold was reached.

17. The method of claim 13, wherein said receiving the data stream sent by the instrument comprises proxying, using a proxy server, communications between the instrument and the controlling device.

18. The method of claim 13, further comprising:

determining instrument utilization based on at least one of run state information collected from the identified data frames in the data stream and a bit rate of the data stream.

19. The method of claim 13, further comprising:

based on data or metadata collected from the identified data frames in the data stream, triggering one or more alerts or generating visualizations.

20. A non-transitory computer readable medium having stored thereon software instructions that, when executed by a processor, cause the processor to interpret a data stream, by executing steps comprising:

receiving the data stream sent by an instrument to a controlling device; and identifying data frames in the data stream using a first process thread by:

searching for a first instance of a bit pattern in the data stream;

identifying bits corresponding to a message length of a first presumed data frame based on a location relative to the first instance of the bit pattern;

identifying a second presumed data frame in the data stream based on the message length of the first presumed data frame;

determining whether a second instance of the bit pattern exists at a predicted location in the second presumed data frame;

in response to identifying the second instance of the bit pattern at the predicted location, increasing a count of the bit pattern and continue scanning for the bit pattern at predicted locations in presumed data frames until a threshold for the count is reached; and in response to the threshold for the count being reached, identify the first presumed data frame and the second presumed data frame as actual data frames.

\* \* \* \* \*